US008913525B2

(12) United States Patent
Welin et al.

(10) Patent No.: US 8,913,525 B2
(45) Date of Patent: Dec. 16, 2014

(54) METHOD OF MERGING DISTRIBUTED HASH TABLE (DHT) RINGS IN HETEROGENEOUS NETWORK DOMAINS

(75) Inventors: Annikki Welin, Solna (SE); Victor Souza, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 378 days.

(21) Appl. No.: 13/488,907

(22) Filed: Jun. 5, 2012

(65) Prior Publication Data
US 2012/0300676 A1  Nov. 29, 2012

Related U.S. Application Data

(62) Division of application No. 12/516,470, filed as application No. PCT/SE2007/050894 on Nov. 23, 2007, now Pat. No. 8,233,489.

(60) Provisional application No. 60/867,347, filed on Nov. 27, 2006.

(51) Int. Cl.
| H04L 12/28 | (2006.01) |
| H04L 29/08 | (2006.01) |
| H04L 12/721 | (2013.01) |
| H04L 12/751 | (2013.01) |
| H04L 29/12 | (2006.01) |
| H04L 12/715 | (2013.01) |

(52) U.S. Cl.
CPC .............. *H04L 67/104* (2013.01); *H04L 45/70* (2013.01); *H04L 67/1065* (2013.01); *H04L 45/02* (2013.01); *H04L 29/12028* (2013.01); *H04L 45/64* (2013.01); *H04L 45/124* (2013.01); *H04L 61/103* (2013.01); *H04L 61/2507* (2013.01); *H04L 29/12349* (2013.01)
USPC .................. 370/258; 370/395.31; 370/395.32

(58) Field of Classification Search
None
See application file for complete search history.

(56) References Cited

U.S. PATENT DOCUMENTS

| 7,496,051 | B2 * | 2/2009 | Wan et al. ...................... 370/254 |
| 7,613,796 | B2 * | 11/2009 | Harvey et al. ................. 709/220 |
| 8,139,508 | B1 * | 3/2012 | Roskind ......................... 370/255 |
| 8,160,056 | B2 * | 4/2012 | Van der Merwe et al. ..... 370/351 |
| 8,681,662 | B2 * | 3/2014 | Roskind ......................... 370/255 |

* cited by examiner

*Primary Examiner* — Michael J Moore, Jr.

(57) ABSTRACT

A method of merging Distributed Hash Table (DHT) rings in heterogeneous network domains, where each domain includes a DHT ring. Upon determining that a node is common to first and second DHT rings on the same hierarchical level and having at least one Overlay Router in common, a link is started between a node in the first DHT ring and a node in the second DHT ring by establishing an indirect link through the common node. An indirect link is created between the first and second DHT rings, and virtual links are created to DHT rings positioned higher in the DHT ring hierarchy until all the DHT rings are merged into a single logical ring.

5 Claims, 6 Drawing Sheets

METHOD OF MERGING DISTRIBUTED HASH TABLE (DHT) RINGS IN HETEROGENEOUS NETWORK DOMAINS

RELATED APPLICATIONS

This application is a divisional of U.S. patent application Ser. No. 12/516,470 filed May 27, 2009 now U.S. Pat. No. 8,233,489, which is a 371 of International Application No. PCT/SE2007/050894, filed Nov. 23,2007, which claims benefit to U.S. Provisional Application No. 60/867,347 filed Nov. 27, 2006, the disclosures of which are fully incorporated herein by reference.

TECHNICAL FIELD

The present application relates to networks in general and heterogeneous layer-3 networks in particular. More particularly, the present application relates to overlay routing architecture for heterogeneous layer-3 networks.

BACKGROUND

Overlay networks have gained attention both in the academic world and in the industry in the last few years. Various overlay applications are spread through the Internet, making it ubiquitous and highly used by end users. An overlay network is capable of improving reliability, performance and availability to an existing infra-structure network. Overlay networks provide an elegant way to solve several networking problems, especially when no changes should be done to the existing network and the network is heterogeneous.

Currently, few solutions are found in the literature to solve the problem of packet routing in overlay networks built over flat identifiers. A fundamental problem that exists with routing based on flat identifiers is that the flat identifier space can not be aggregated. Most of existing routing is based on hierarchy and aggregations of Internet Protocol (IP) addresses to network addresses, so called sub-netting. Applying a subnet mask to an IP address allows you to identify the network and node parts of the address.

File sharing overlay applications usually are constructed based on flat identifiers. This kind of overlay application relies on Distributed Hash Tables (DHTs) in order to find a given resource. DHTs are a type of decentralized distributed data structure. Each node taking part in a DHT has one unique overlay identifier, normally a flat identifier. However, the identifiers are not used for data packet routing; they are used to route messages of lookup for a given resource (a file, for example). The session communication establishment in these overlay networks is accomplished by resolving the overlay identifier (of a resource) into the underlay address (of the resource holder), and then the data packet routing is completely done in the underlay level. Therefore, the data packet routing relies on the routing mechanism of the underlying network (e.g., IPv4). This solution is reasonable since only one homogeneous underlying network is assumed. Note that this requires one unique homogeneous layer-3 technology for all the nodes participating in the overlay network. However, when heterogeneous layer-3 networks (or domains) coexist, the network address of a node can be meaningless to another peer.

Several protocols that implement the concept of DHTs have been proposed in the last years, e.g., CAN, Chord, Pastry and Tapestry protocols. Although these protocols have some disparities they all utilize the same principles; a key is usually produced by hashing a filename. The generated key is employed to store or lookup locality information of the file in an overlay network formed by nodes that are members of the DHTs.

The DHT internal routing algorithm, i.e., the mechanism for routing store and lookup messages, is the heart of the DHT protocol. The member nodes form an overlay network with each node having a group of other nodes as neighbors. When a lookup for a given key is carried on, the message is routed through the overlay network to the node responsible for that key. The overall scalability and performance of the system is directly connected to the routing algorithm efficiency.

With the purpose of distributing the processing and storage load, each node handles a portion of the hash space and therefore is responsible for a certain key range. Given a key, all nodes can efficiently route messages to the unique node responsible for that key. DHTs provide properties such as decentralization, scalability, load balance, fault tolerance, and self-healing. Decentralization distributes the keys through the nodes and the organization of the system occurs without any central coordination. No node is more significant than any other. Scalability allows the system to handle a large number of nodes even with high churn (nodes joining and leaving the structure frequently). In general, the cost of the lookup process grows with the log of the number of nodes.

Load balance using a consistent hashing function spreads the key range over the nodes with high probability, providing an innate way of doing load balancing. Fault tolerance of the system provides reliability even when failures of some nodes occur. Self-healing enables automatic reorganization of the system, reflecting the newly joined, left or failed nodes.

The DHT nodes may join or leave the network. The protocols must solve this issue in order to keep the system consistent. Consistency is assured by properly updating the routing table when a node joins or leaves the network. The basic structure is built around an abstract flat keyspace, which is split among the participating nodes according to the keyspace partitioning scheme. Each implementation uses some variant of consistent hashing to map objects (e.g., a filename) into a key. The consistent hashing implies that high churn rates affect only the set of keys owned by the adjacent nodes, leaving all other nodes unaffected. The minimization of movement of stored objects from one node to another reduces the reorganization time, allowing high rates of arrival and departure of nodes in the system. This contrasts with the traditional hash table where the addition or removal of one hash bucket requires the remapping of the entire keyspace.

The key matter is how to organize the nodes in a way that the lookup process becomes efficient. More than that, the efficiency of the lookup process depends on where and how much data is replicated, on the cache mechanism used and on how the search for a key is conducted. Upon receiving a lookup query, a node checks if the data corresponding to the searched key is stored locally. In that case, the data is returned and the search ends. If that is not true, the node selects a peer closer to where the data is stored and forwards the query to this node. The definition of a "closer" peer is protocol dependent. Nodes maintain a DHT routing table to assist the decision of lookup (or store) query forwarding. The process is similar to IP packet routing—if a router cannot deliver the packet directly, it chooses another router that is closer to the final destination. Routing in DHTs aims at sending the query toward a node where the key is stored. The routing table keeps a set of neighbor nodes. Neighborhood relationships can be based on physical proximity, proximity of node identifiers, successor and predecessor relationships, among others.

Figure 1:
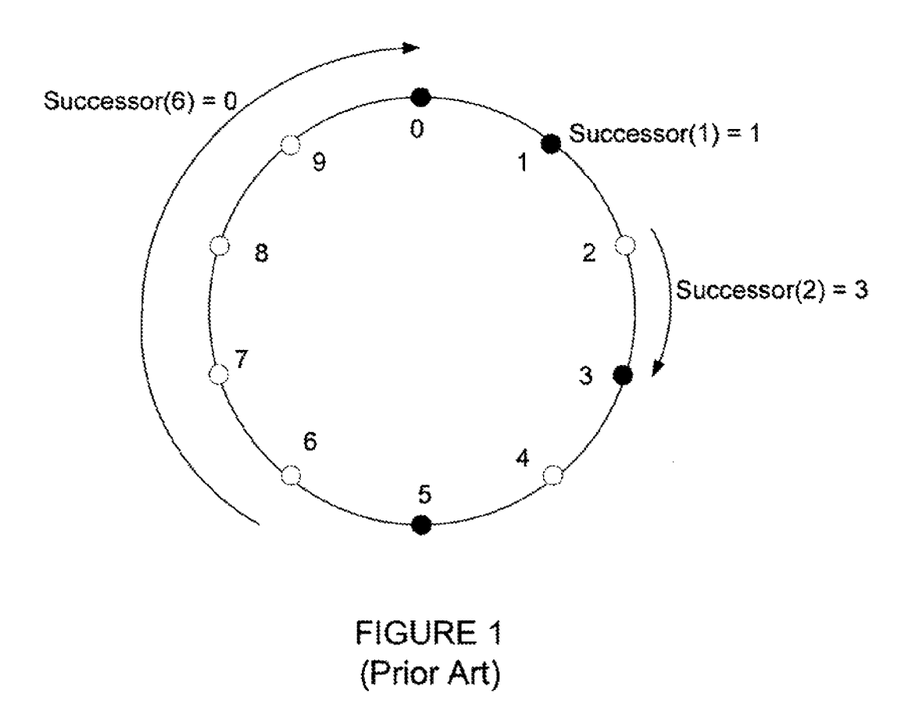
FIG. 1 illustrates a Chord ring.

FIG. 1 illustrates a Chord ring, probably the best known DHT protocol. The Chord protocol uses a fast consistent hashing function which assigns each node an m-bit identifier using a cryptographic hash function such as MD5. A node receives an identifier by hashing its own IP address. In FIG. 1, m=3, the shaded circles represent nodes and the keys 1, 2 and 6 are stored in nodes 1, 3 and 0, respectively. The identifier space can be illustrated as a circle, modulo 2m, arranged in increasing order clockwise. The key k is assigned to the first node whose identifier is equal to or follows k in the identifier space. This node is also called the successor node of the key k.

It is accepted wisdom that IP addresses are currently overloaded with two functionalities: locator, as the IP address is used to route packets in the network, and identity, as the IP address is also used to specify an interface card. The overloading of both functionalities in IP addresses is one of the aspects that make mobility of nodes a difficult task. Autonomous administered heterogeneous layer-3 networks can be connected, but the network address of the destination can be meaningless to another node.

Therefore, there is a need in the art for a scalable, reliable and resilient routing architecture for overlay networks associated with heterogeneous layer-3 networks.

SUMMARY

In one aspect, the present invention provides a method of routing data packets in an overlay network that is built over heterogeneous layer-3 domains. The method includes the steps of: defining and associating unique, self-generated flat identifiers with layer-3 network addresses in the layer-3 domains; utilizing a transport protocol for binding communication sessions to the flat identifiers instead of the layer-3 network addresses; utilizing an Overlay Router that is capable of routing in the overlay network and in the layer-3 network, the Overlay Router adapted for translating between different layer-3 protocols; registering end-nodes with Hierarchical Distributed Hash Tables adapted to work in the heterogeneous layer-3 domains; and routing data packets between registered end-nodes via the Overlay Router in the overlay network, utilizing an Overlay Router header in the data packets that includes network identifiers instead of end-node identifiers.

In another aspect the present invention provides a routing architecture for an overlay network built over heterogeneous layer-3 domains. The architecture is comprised of: means for defining and associating unique, self-generated flat identifiers with layer-3 network addresses in the layer-3 domains; a transport protocol for binding communication sessions to the flat identifiers instead of the layer-3 network addresses; at least one Overlay Router that is adapted for routing in the overlay network and in the layer-3 network, the Overlay Router adapted for translating between different layer-3 protocols; registration means for registering end-nodes with Hierarchical Distributed Hash Tables adapted to work in the heterogeneous layer-3 network; and the Overlay Router for routing data packets between registered end-nodes in the overlay network, utilizing an Overlay Router header in the data packets that includes network identifiers instead of end-node identifiers.

In yet another aspect, the present invention provides method of merging DHT rings in heterogeneous network domains, wherein each domain includes a DHT ring. The method comprises: determining that a node is common to a first and a second DHT ring, the first and second DHT rings being sibling rings; starting a link between a node in the first DHT ring and a node in the second DHT ring by establishing an indirect link through the common node; creating an indirect link between the first and second DHT ring, the first and second DHT ring being on the same hierarchical level and having at least one Overlay Router in common; creating virtual links to DHT rings positioned higher in the DHT ring hierarchy until all the DHT rings are merged into a single logical ring.

In still another aspect, the present invention provides an overlay router for routing data packets in an overlay network built over heterogeneous layer-3 domains. The overlay router comprises a receiver means for receiving a message that comprises flat identifiers from an end-node that is registered with an Hierarchical Distributed Hash table which Is adapted to work in the heterogeneous layer-3 domain. The overlay router also include means for associating the flat identifiers with layer-3 network addresses in the layer-3 domains and means for utilizing a transport protocol for binging communication sessions to the flat identifiers. The overlay router includes means for translating between different layer-3 protocols and for routing the message in the overlay network

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follow are presented in terms of algorithms and symbolic representations of operations on data bits or binary digital signals within a computer memory. These algorithmic descriptions and representations may be the techniques used by those skilled in the telecommunication arts to convey the substance of their work to others skilled in the art.

The following are abbreviations, acronyms, definitions and assumptions that will be used throughout the detailed description:

DHT—Distributed Hash Table is a data structure that is distributed in some nodes in the network, instead of being centralized in only one machine.

Each node belonging to the DHT is responsible for a range of the complete space of keys. Each key, as in any common hash table, can have one (or more) value(s) assigned to it.

HDHT—Hierarchical Distributed Hash Table

HIP—Host Identity Protocol

NodeID—Self-generated end-node identifier. This identifier can be cryptographic, e.g. the hash of a public-key.

Layer-3—Layer 3 refers to the network layer of the Open Systems Interconnection (OSI) model. A router is a layer 3 device and an Internet Protocol (IP) address is a layer 3 address.

NetworkID—Self-generated network identifier. This identifier can be cryptographic, e.g., the hash of a public-key.

OR—An Overlay Router is a special node in the network capable of routing in the overlay level of the network. This node possesses a cryptographic flat identifier (called RouterID) and may be attached to heterogeneous layer-3 networks, translating packets between IPV4, IPv6 and private IP networks (built with private IP addresses).

RouterID—Cryptographic, self-generated Overlay Router identifier. This identifier is the hash of a public-key.

RTT—Round Trip Time is measured from the time a packet is sent to a given node until a response is received at the originating node.

A domain or network domain consists of a collection of end-nodes and routers having a common layer-3 addressing and internal routing protocol.

A branch consists of a collection of different layer-3 network domains, in the border of the core, attached together by means of Overlay Routers.

For each level of the DHT the Chord protocol is used.

Overlay Routing architecture is based on a link state protocol, where the performance of the links is measured by sending probe messages between peers (Overlay Routers). The parameters measured can include (but are not limited to) round trip time, throughput, and loss rate.

Hierarchical Distributed Hash Tables (HDHTs) are used in heterogeneous layer-3 domains, which is a new environment for the use of HDHTs. Moreover, routing is solved in heterogeneous layer-3 domains and eases mobility of layer-3 networks and end-nodes. The overlay routing architecture creates a scalable and resilient routing architecture for overlay networks built over flat identifiers. The overlay routing protocol is capable of scaling while providing resilience and fast convergence of routes.

In Hierarchical DHTs (HDHTs), peers are organized into groups based on locality and each group has its autonomous intra-group overlay network and lookup service. The Hierarchical DHTs have a number of advantages over flat identifier approaches: for instance, they reduce the average number of peer hops in a lookup; they significantly reduce the lookup latency when the peers in the same group are topologically close and co-operative caching is used within the groups: they provide administrative autonomy for every level of the hierarchy; and they facilitate the large-scale deployment of a peer-to-peer, P2P, lookup.

An overlay network is created by defining flat identifiers over layer-3 network addresses. The flat identifiers, similar to Host Identity Protocol (HIP), are self-generated, hashed, cryptographic keys and do not possess any kind of structure or hierarchy. The functionalities of location and identity, currently overloaded in IP addresses, are in this way separate in two different layers. A transport protocol binds communication sessions to the self-generated, flat identifiers and not to layer-3 addresses. In this way the mobility of end-nodes is increased since the identifiers are generated by the end-nodes and an end-node's identifier should not change when it moves. The same applies to networks moving, i.e., a network identifier should not change when an entire network moves. Therefore, it is possible to have heterogeneous layer-3 domains coexisting and communicating given that certain conditions apply: each node should have a globally unique self-generated identifier; an Overlay Router is employed to translate between different layer-3 protocols; the Overlay Router is capable of routing both in the overlay and in the underlay (layer-3) level; and the end-nodes are registered with HDHT data structure so as to provide global "reachability" to other nodes (in one embodiment the end-nodes are registered with the HDHT data structure).

Although heterogeneous layer-3 network domains are permitted to coexist, the existence of a homogeneous core network is assumed, in order to ease the deployment of the solution, as the core could be the IPv4 Internet In this way, the mobility and overlay routing would be restricted to nodes and networks in the border of the core ("branches," hereinafter). The already deployed and static IPv4 core and backbones are not altered by the disclosed invention.

The entity responsible for translating between different layer-3 networks, an Overlay Router (OR), has a unique, flat, self-generated, cryptographic identifier. Overlay routing protocol is executed by Overlay Routers to distribute topology information and measurements of virtual link performance. A virtual link is a logical connection between Overlay Routers, the connection of the routers being established at layer-3. This connection may traverse several layer-3 routers within the domain; however, the Overlay Routers are logically seen as neighbors. The overlay network utilizes a mesh structure, and topology information messages are created and distributed to enable the Overlay Routers to create an exact map of the network branch. Instead of a routing based on the end-node identifiers, the overlay routing is accomplished with a link state routing using NetworkIDs—cryptographic network identifiers.

In order to communicate with a node it is necessary to obtain a network identifier of the domain to which the node is attached at that moment. This information is inserted in a packet, which is routed based on the network identifier. A core Overlay Router identifier, is also obtained, with the core Overlay Router being the last router in one branch directed towards other branches in the global network. Mapping between identifier and locator is done in each domain by local means and different domains may choose to use diverse ways of doing the mapping.

Figure 2:
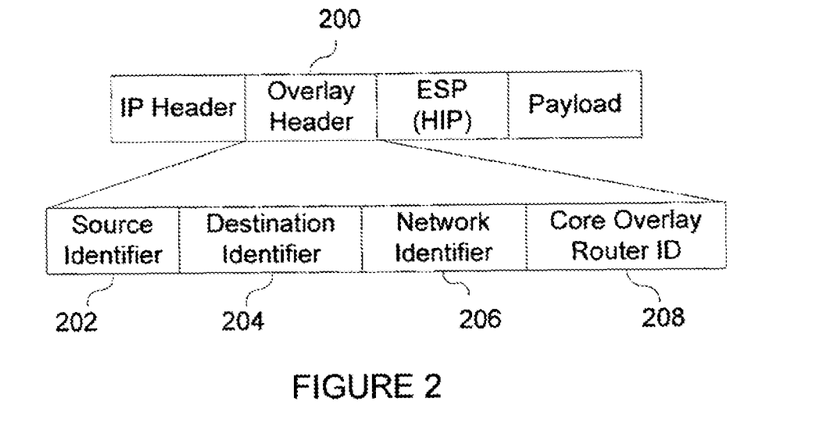
FIG. 2 illustrates a data packet format in accordance with an embodiment of the present invention.

FIG. 2 illustrates a data packet format in accordance with an embodiment of the present invention. The IP packet includes an Overlay header with Host Identity protocol (HIP) being used for end-to-end security. Host Identity Protocol (HIP) is just one protocol that can be used for end-to-end security. Overlay header 200 comprises self generated identifiers including source identifier 202, destination identifier 204, network identifier 206 and core Overlay Router identifier 208.

Data packet routing is done initially in a branch of a tree in the network and if the destination is in the same branch the packet will be routed only within that branch (based on the NetworkID). If a destination node is outside the current branch, the packet is routed to the core Overlay Router of the current branch. The core Overlay Router is the overlay network router associated with a particular branch in the network. This node then routes the packet to the core Overlay Router of the destination node (this information is present in the packet). The routing in the destination branch is done based on the destination NetworkID.

It is important to note that the Overlay Routers are essentially stateless. Although they need to keep registration information (stored in the HDHT and collocated with the OR) there is no session establishment phase when packets are sent in the network. If reliability is needed it should be provided by upper layer protocols (e.g., TCP).

The architecture provides a routing solution for overlay networks constructed with flat identifiers. The advantage of flat identifiers is the autonomy of identifier assignment, i.e., it is not necessary to have a neutral administrative body responsible for assigning identifiers. In order to amend scalability of the system routing is based on network identifiers instead of end-node identifiers.

Figure 3:
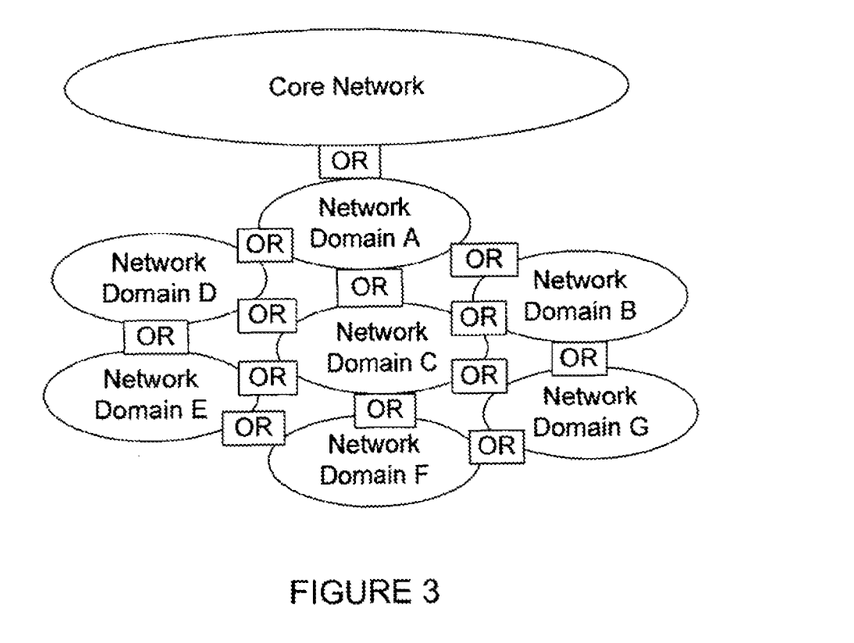
FIG. 3 depicts an Overlay Network in accordance with an embodiment of the present invention.

FIG. 3 depicts an Overlay Network in accordance with an embodiment of the present invention. In the overlay level a routing algorithm defines the next Overlay Router hop to reach a destination network. Inside each one of the network domains packet routing is done by an existing layer-3 routing protocol.

Overlay Routers are capable of routing packets to a given destination based on a Network Identifier (NetworkID). The network identifier belongs to the network where the destination node is currently connected. One end-node (originator) attempting to communicate with another end-node (destination) should be able to discover the network to which the destination node is currently connected. In one exemplary embodiment, this information can be obtained via a Hierarchical Distributed Hash Table (HDHT). Hierarchical solutions improve scalability in the network design since it allows aggregation. It is important to emphasize that the HDHT structure is an option used for the name resolution process. Given a node identifier, the HDHT will reply with the identifier of the network to which the node is currently attached. This information is later inserted in the data packets for routing purposes.

Figure 4:
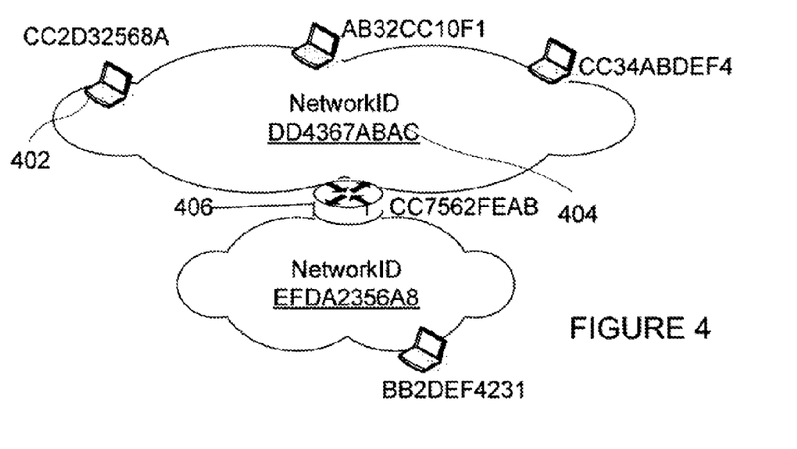
FIG. 4 depicts an addressing scheme based on flat identifiers in accordance with an embodiment of the present invention

FIG. 4 depicts an addressing scheme based on flat identifiers in accordance with an embodiment of the present invention. Three identifier types are defined, the first has a scope of an end-node 402, the second has the scope of an Overlay Router 406 and the last has the scope of a network domain 404. The identifiers are represented in hexadecimal format. The identifiers are the hash of a public key and do not present any kind of structure. In this example, the identifiers are 40 bits long (10 hexadecimal digits).

An Overlay Router (OR) constructs its routing table from information advertised by other ORs. An Advertisement Message is used to announce connectivity and keep a session between Overlay Routers alive. Due to the dynamicity of the networks, the maintenance of neighboring relationships between Overlay Routers is dynamic as well. The Advertisement Message contains the set of network identifiers to which the Overlay Router is attached and its own identifier. Furthermore, it contains the connectivity information received from a third router, using a flooding mechanism. The propagation of this data is limited in scope to one branch of the network, i.e., the propagation does not cross the core network but stays in one branch of the overlay. The Overlay Router attached to the core network does not spread this information into the core. The Overlay Router is registered into the system informing that it belongs to the top level. In this manner, each Overlay Router has a perfect map of the network branch to which it belongs. The frequency in which the advertisements are done is implementation dependent. The faster it is, the faster the routing protocol will converge.

The Overlay Router sends Performance Messages which are used to advertise the current conditions of a given virtual link, such as current RTT (Round Trip Time). A process running in each OR is constantly measuring the performance parameters of the virtual link—this is called a probing process. Network probes are sent only between neighboring ORs. A mandatory set of parameters must be implemented by every OR and additional ones can be designed for specific applications. "Hello" messages can be sent just to keep the session alive, in case no other message is sent before the session timeout. Performance Messages are used to aid routing computation by choosing, for example, a path with shortest RTT. In this way, the routing protocol is capable of applying traffic engineering techniques.

Figure 5:
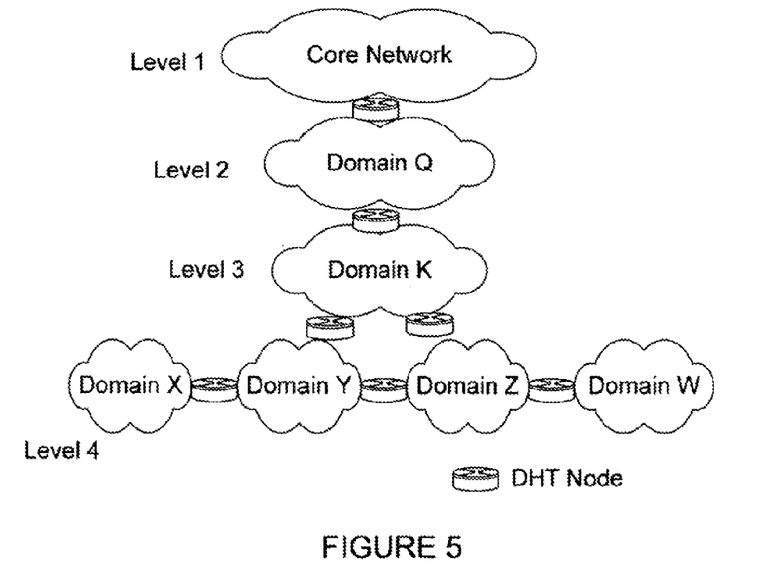
FIG. 5 illustrates a high level block diagram of Hierarchical DHTs installed in different domains according to an embodiment of the present invention.
Figure 7:
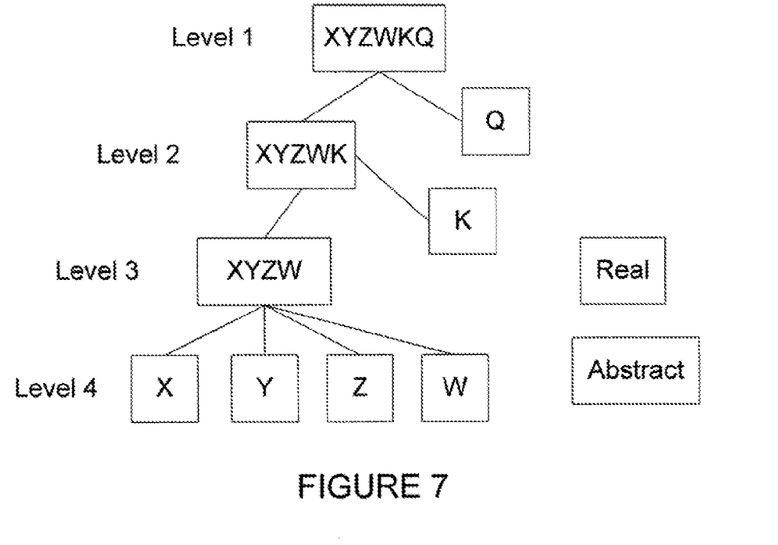
FIG. 7 depicts HDHT applied over the network infrastructure according to an embodiment of the present invention

FIG. 5 illustrates a high level block diagram of Hierarchical DHT nodes installed in different domains according to an embodiment of the present invention (see also FIG. 7 as it is a different view of the same network). There is no caching of retrieved information in the HDHT since the nodes and networks can move which will invalidate any cached data. For instance, a network can move entirely, and consequently all the nodes contained in the network also move (for instance, an imbedded network on a train or an airplane). A single node (e.g., a laptop, palmtop, cellphone, etc) can move from network X to network Y also.

Each network domain possesses a DHT ring. The rings in one branch of the network should merge to generate higher levels of the structure. In order to provide data locality the registration of the node within the HDHT is stored in a local DHT ring (where the node is currently attached). The data is stored in the local ring, although other levels in the hierarchy may have access to it. In other words, the storage domain will always be the local ring and the access domain can vary. The common situation is to desire a world wide access domain, i.e., the node can be localized in all other parts of the world. But if the end-node only wants to be accessible in a smaller portion of the hierarchy, that is also possible. For example, usually the end-users want the computer or device to be accessible world wide. When they are accessing a web page in Europe but they are physically located in the USA they want to have world wide connectivity. But suppose one has a laptop in an office that should not be accessed from the outside world. Therefore, one would only register the laptop in the office DHT ring, not allowing the registration to propagate.

Figure 6:
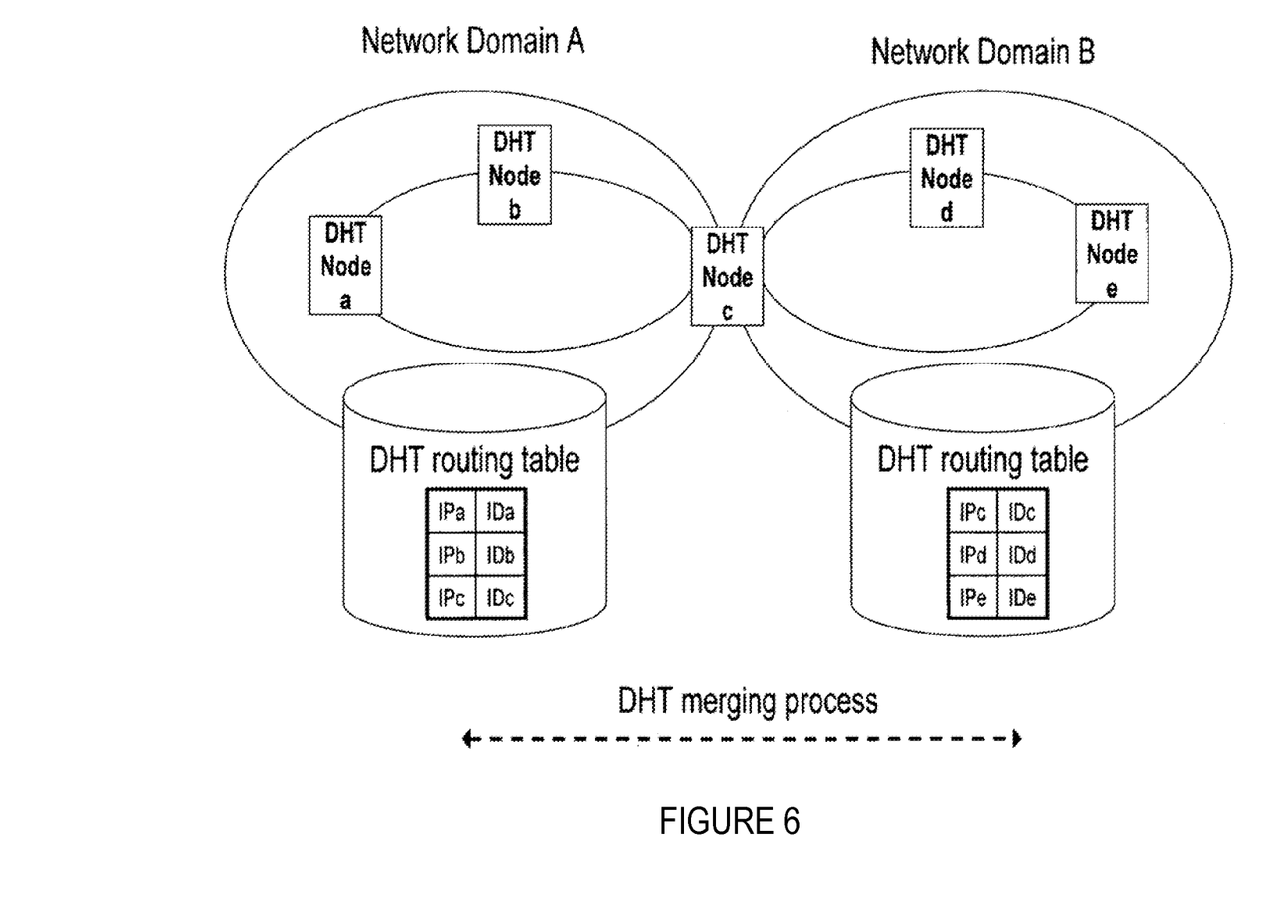
FIG. 6 is a high level block diagram of a DHT merging process in accordance with a preferred embodiment of the present invention.

FIG. 6 is a high level block diagram of a domain merging process in accordance with a preferred embodiment of the present invention. The DHT rings are merged based on a bottom-up approach for the construction of the hierarchy, otherwise the system might get in an inconsistent state (rings merging with already merged rings in other levels). On the other hand, the structure is not rigid and rings can join and leave the system.

Hierarchical DHTs must be adapted to work in a heterogeneous environment. Links to other DHT rings are adapted to point to an OR attached to the same network domain as the destination DHT node. In this way, indirect links are created. This is possible due to the fact that each OR has a complete map of the branch in which the OR is resident. It can forward lookup/store messages to one OR that is closest to the destination DHT node, through the indirect link.

Node C belongs to the ring that is present in the Network Domains A and B. DHT Node C is a common node between the two domains. A DHT routing table is present in every one of the nodes of both domains. Therefore, node C includes both routing tables. An indirect link routes through Node C, which, including both A and B Domain routing tables, has sufficient information to route messages in both rings.

As the network grows, tuning of the network functionalities is possible. Additional performance links are provided for each DHT-node to achieve better performance. The establishment of performance links is based on collected information of heavily used nodes. If there are node or network movements, since the solution allows mobility, the performance links are deleted.

A maximum search time parameter is defined that is associated with an unsuccessful search. In some cases the search functions are not completed due to "stale" topology information in a node that has not been updated. These situations are temporary, since the routing protocol will propagate topology changes to neighbors.

HIP Base Exchange is an option for providing end-to-end security and end-node authentication in the system. The Base Exchange can generate a session key that can be used in a cryptographic protocol (e.g., Encapsulated Security Protocol) the same way as HIP does. Moreover, the end-node registration in the HDHT can be done using a secured connection that provides origin authentication. The HDHT node would only allow the insertion of data that has its origin properly verified (if the possession of the private key matching the public key cannot be done the node will not be registered).

FIG. 7 depicts HDHT applied over the network infrastructure according to an embodiment of the present invention. Each cube represents one DHT ring installed in one network domain. The network domains shown are organized topologically as shown in FIG. 5. The level of a domain and the level of a DHT ring are defined as the minimum number of Overlay Routers necessary to reach the core, plus one. For example, if the shortest path from one network to the core traverses 3 Overlay Routers the level of such domain is 4. Sibling rings are defined as rings in the same level which have at least one common Overlay Router. As a rule, sibling rings should merge. If no sibling rings exist, the ring should merge with its upper level ring. DHT rings X, Y, Z, and W are at level 4 and merge to create the abstract ring XYZW (logically defined as being of level 3). The abstract ring XYZW has one common Overlay Router with ring K, and therefore they should merge. This merging creates the abstract ring XYZWK, by definition of level 2. This process is repeated until all rings in one branch join the HDHT; in this example abstract ring XYZWKQ of level 2.

Figure 8:
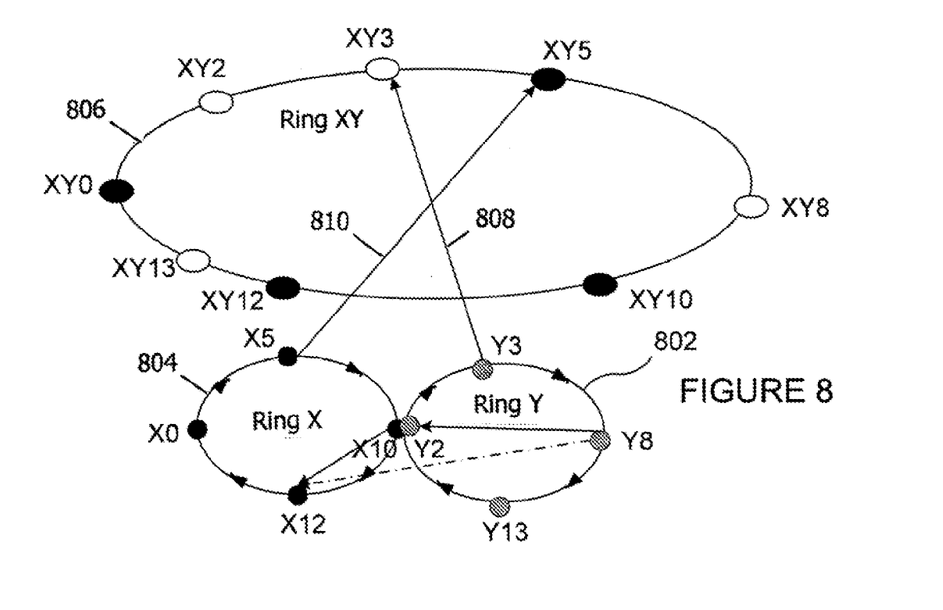
FIG. 8 illustrates an environment where two rings residing in different layer-3 domains need to merge in accordance with an embodiment of the present invention.

FIG. 8 illustrates an environment where two DHT rings, residing in different layer-3 domains need to merge in accordance with an embodiment of the present invention. Two real DHT rings, ring 802 and ring 804, should merge in order to generate higher levels of the structure. According to the rules, ring 802 and ring 804 are sibling rings and should merge. One node in the system participates in both rings; this is nodes Y2 (ring 802) and X10 (ring 804) which are physically the same node. Following the rules of merging, node Y8 determines to establish a link to node X12. The network address of X12 is unknown to Y8. However, Y8 knows that to reach X12 it should pass through Y2 (same as X10). Therefore, it establishes an indirect link and all DHT messages destined to X12 will be forwarded to Y2 that will then deliver the messages to X12 (The dashed line represents the indirect link and the solid lines represent the actual path followed by the messages). After the merging occurs, logical ring 806 is created (ring XY). The arrows 808 and 810 indicate the relation between the physical and logical nodes in rings 802 and 804.

In one embodiment of the present invention each Overlay Router hosts a DHT node (not shown) to facilitate communication between the different levels of DHTs. Distinct layer-3 technologies may be used in the system and the Overlay Router is the only entity that can forward traffic between heterogeneous domains. As a result, all the ORs connected to a network domain are part of a DHT or Chord ring. The ORs are considered very stable as they are not used for any other computing procedures.

Figure 9:
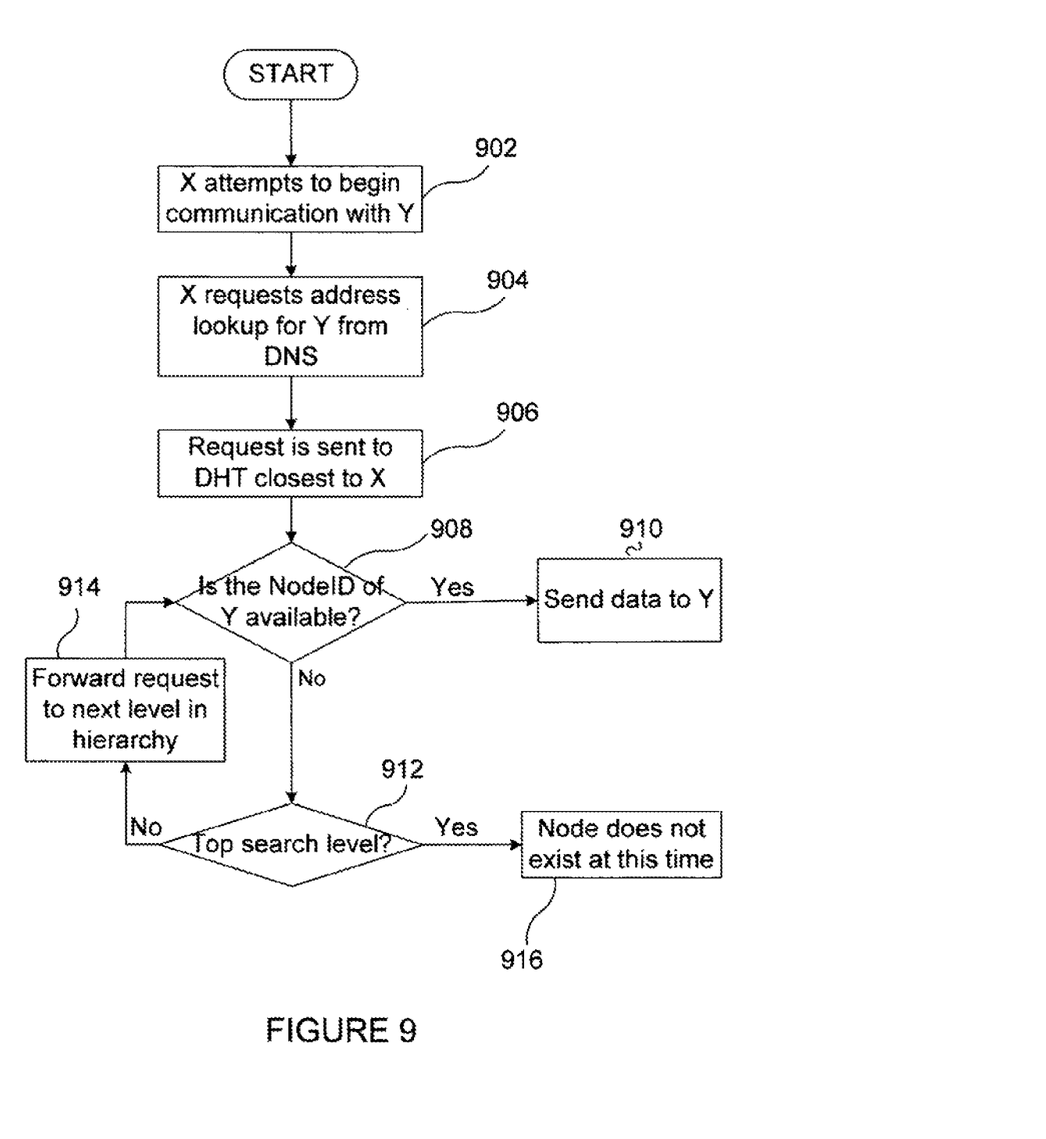
FIG. 9 depicts a process of communicating using Overlay Routers in accordance with an embodiment of the present invention.

FIG. 9 depicts a process of communicating using Overlay Routers in accordance with an embodiment of the present invention. The process begins when end-user X would like to communicate with end-user Y by sending a file (step 702). End-user X has a computer with an IP address (IPv4, IPv6 or private IP address). End-user (Y) has a computer with another IP address and the computer is registered in a Domain Name Server (DNS) (association between FQDN—Fully Qualified Domain Name—and NodeID). End-user Y has registered its NodeID, core RouterID, and NetworkID in the HDHT.

End-user X begins the communication by making a lookup in the DNS to resolve the FQDN (the URL address) of the end-user Y and obtain the NodeID for that resource (step 704). The destination NetworkID and the core RouterID of the destination node can be obtained via HDHT. The request is sent first to the closest DHT ring (step 706); if it can solve the NodeID (step 708) of the requested computer the procedure is finished (step 710). If not, the request is forwarded to the next level in the hierarchy (step 712). If the top level has been reached, the process moves to step 716 and determines that the node does not exist. If the top level has not been reached the process moves to step 714 and the request is forwarded to the next level in the hierarchy and steps 708 are repeated until the top level is reached.

The number of levels is dependent on the structure of the network; typically, the limit is when the search reaches the top level. The search scope can also be restricted, in case of a local search, for example. This case of search is not propagated upwards. A specified maximum search time may also limit the search.

After completion of the described steps of name resolution the end-user X is capable of sending data to end-user Y via Overlay Routers. The packets include the NetworkID, the NodeID and the core RouterID of end-user Y. By using this information the Overlay Routers are capable of delivering the packets to the destination.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method of merging Distributed Hash Table (DHT) rings in heterogeneous network domains, wherein each domain includes a DHT ring, the method comprising:
   determining that a node is common to a first and a second DHT ring;
   starting a link between a node in the first DHT ring and a node in the second DHT ring by establishing an indirect link through the common node;
   creating an indirect link between the first and second DHT ring, the first and second DHT ring being on the same hierarchical level and having at least one Overlay Router in common; and
   creating virtual links to DHT rings positioned higher in the DHT ring hierarchy until all the DHT rings are merged into a single logical ring.

2. The method of claim 1, wherein creating an indirect link between the first and second DHT ring further comprises adapting links between DHT rings to point to an Overlay Router attached to the same network domain as a destination DHT node.

3. The method of claim 1, wherein a DHT routing table is present in every one of the nodes of each of the DHT rings and the node common to both node includes tables from both DHT rings.

4. The method of claim 1, wherein the level of a domain and the level of a DHT ring are defined as a minimum number of Overlay Routers necessary to reach to a core network, plus one.

5. The method of claim 4, wherein if there are no rings on the same hierarchical level, a particular DHT ring can merge with a DHT ring next higher in the level of the DHT ring hierarchy if there is at least one Overlay Router in common with the particular DHT ring and the next higher DHT ring.

* * * * *